US008836818B2

(12) United States Patent
Takaki

(10) Patent No.: US 8,836,818 B2
(45) Date of Patent: Sep. 16, 2014

(54) CONTROL APPARATUS, IMAGE CAPTURE APPARATUS, CONTROL METHOD FOR IMAGE CAPTURE APPARATUS, AND STORAGE MEDIUM

(71) Applicant: Canon Kabushiki Kaisha, Tokyo (JP)

(72) Inventor: Yasuhito Takaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/658,631

(22) Filed: Oct. 23, 2012

(65) Prior Publication Data
US 2013/0113949 A1 May 9, 2013

(30) Foreign Application Priority Data
Nov. 8, 2011 (JP) .................................. 2011-244985

(51) Int. Cl.
*A61B 1/04* (2006.01)
*H04N 5/232* (2006.01)
*H04N 5/76* (2006.01)
*H04N 5/225* (2006.01)

(52) U.S. Cl.
CPC ............. *H04N 5/2251* (2013.01); *H04N 5/232* (2013.01)
USPC ...................... 348/231.3; 348/72; 348/211.14; 600/112

(58) Field of Classification Search
CPC ............ H04N 5/2251; H04N 5/23203; H04N 5/23209; H04N 5/247; A61B 1/053
USPC ........... 348/72, 211.14, 231.99, 231.3, 231.6; 600/109, 112, 118
See application file for complete search history.

(56) References Cited

U.S. PATENT DOCUMENTS

| | | | | |
|---|---|---|---|---|
| 4,961,088 A * | 10/1990 | Gilliland et al. | ................. | 399/25 |
| 5,797,067 A * | 8/1998 | Mitekura | ......................... | 399/79 |
| 6,490,420 B2 * | 12/2002 | Pollocks, Jr. | .................... | 399/12 |
| 6,765,612 B1 * | 7/2004 | Anderson et al. | .......... | 348/231.2 |
| 7,001,330 B2 * | 2/2006 | Kobayashi | .................... | 600/118 |
| 8,095,021 B2 * | 1/2012 | Mochizuki | ..................... | 399/12 |
| 8,634,734 B2 * | 1/2014 | Okumura | ........................ | 399/55 |
| 2003/0097426 A1 * | 5/2003 | Parry | ............................ | 709/220 |
| 2012/0133750 A1 * | 5/2012 | Talbert et al. | .................... | 348/65 |

FOREIGN PATENT DOCUMENTS

JP 63-96642 4/1988

* cited by examiner

*Primary Examiner* — Daniel M Pasiewicz
(74) *Attorney, Agent, or Firm* — Fitzpatrick, Cella, Harper & Scinto

(57) ABSTRACT

A control apparatus includes an independently exchangeable first circuit board that has an electric component and a non-volatile first storage unit; a second circuit board that has an electric component, a non-volatile second storage unit, and a third storage unit; and a controller that accumulates and stores information corresponding to an imaging count in the third storage unit at a first timing that corresponds to imaging performed by the image capture apparatus, and causes information corresponding to the information stored in the third storage unit to be stored in the first or second storage unit at a second timing that occurs at a longer interval than the first timing. The controller stores the information corresponding to the imaging count in the third storage unit after comparing information regarding the imaging count stored in the first and second storage units.

13 Claims, 3 Drawing Sheets

F I G. 3
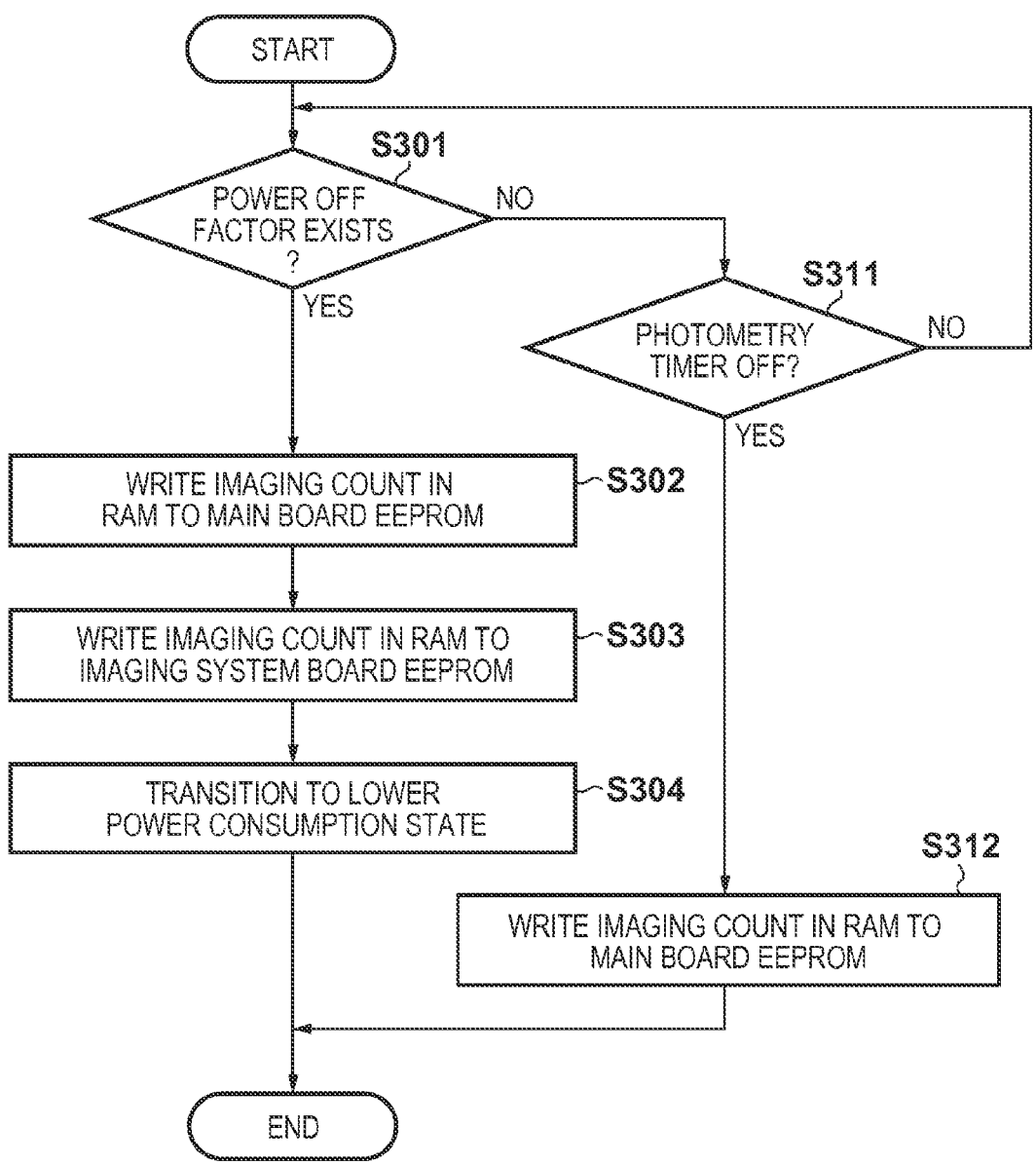

CONTROL APPARATUS, IMAGE CAPTURE APPARATUS, CONTROL METHOD FOR IMAGE CAPTURE APPARATUS, AND STORAGE MEDIUM

BACKGROUND OF THE INVENTION

1. Field of the Invention

The present invention relates to an image capture apparatus such as an electronic still camera, and in particular relates to an image capture apparatus that includes a non-volatile storage medium.

2. Description of the Related Art

As with the camera recited in Japanese Patent Laid-Open No. 63-96642 and the like, it is common for the accumulated imaging count, which is the accumulated number of times that a camera has performed imaging, to be recorded on a non-volatile storage medium, and this recorded value has been used in service support and the like.

However, with the conventional technology disclosed in the aforementioned Japanese Patent Laid-Open No. 63-96642, the accumulated imaging count is simply stored in a non-volatile storage medium, and therefore there has been the problem that the data regarding the accumulated imaging count is lost in the case where, for example, the board having the storage medium mounted thereon is exchanged.

SUMMARY OF THE INVENTION

The present invention has been achieved in light of the above-described issue, and provides an image capture apparatus according to which imaging count data is not lost even if one board having a storage medium mounted thereon is exchanged.

An image capture apparatus according to an aspect of the present invention is a control apparatus for mounting in an image capture apparatus, the control apparatus comprising: a first circuit board that is independently exchangeable and has an electric component and a non-volatile first storage unit mounted thereon; a second circuit board that has an electric component, a non-volatile second storage unit, and a third storage unit mounted thereon; and a controller that accumulates and stores information corresponding to an imaging count in the third storage unit at a first timing that corresponds to imaging performed by the image capture apparatus, and causes information corresponding to the information stored in the third storage unit to be stored in one of the first storage unit and the second storage unit at a second timing that occurs at a longer interval than the first timing, wherein the controller stores the information corresponding to the imaging count in the third storage unit after comparing information regarding the imaging count stored in the first storage unit and information regarding the imaging count stored in the second storage unit.

Further features of the present invention will become apparent from the following description of exemplary embodiments with reference to the attached drawings.

BRIEF DESCRIPTION OF THE DRAWINGS

FIG. 3 is a flowchart illustrating a procedure in which an imaging count is written to EEPROMs.

DESCRIPTION OF THE EMBODIMENTS

Figure 1:
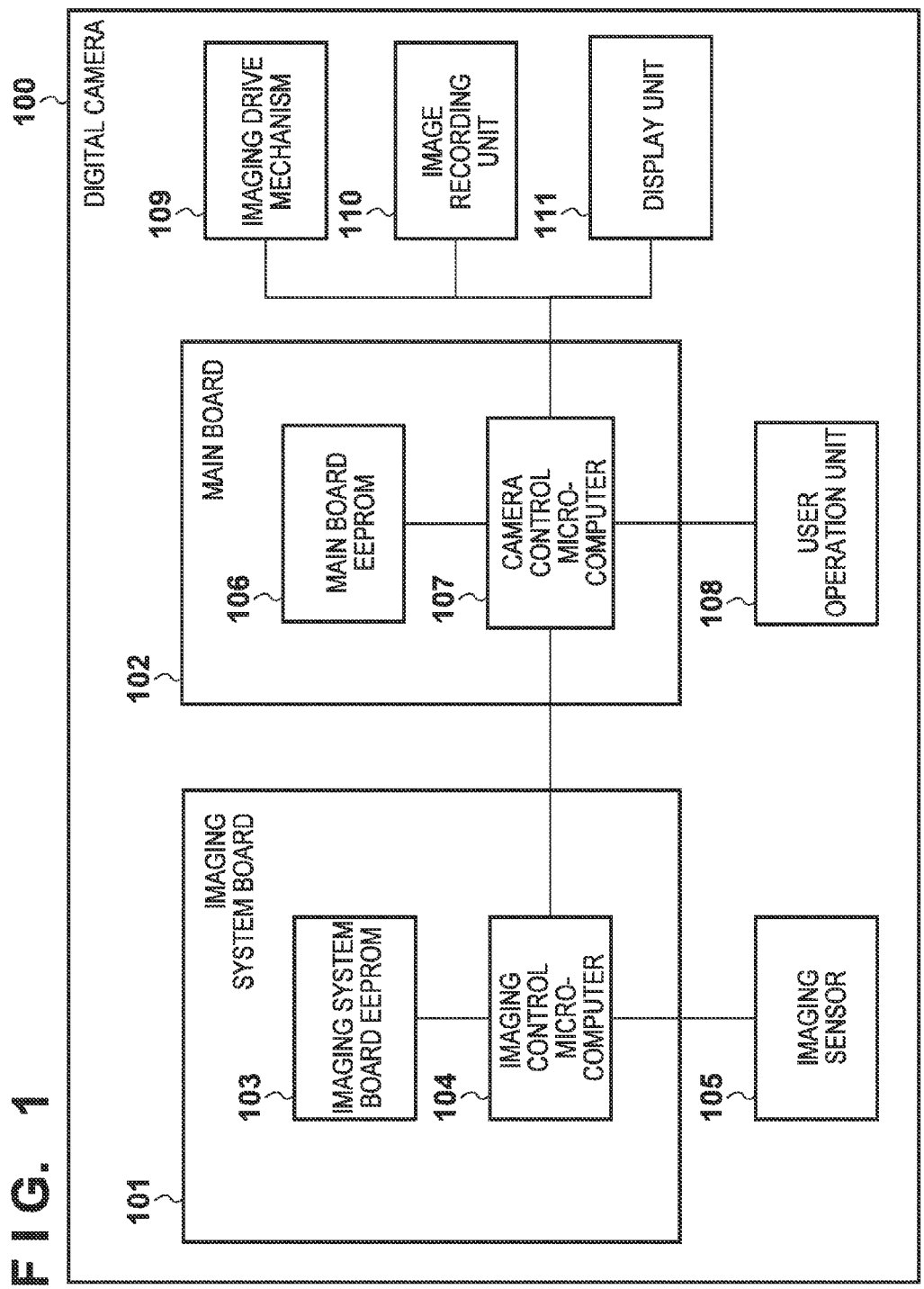
FIG. 1 is a block diagram showing the configuration of a camera according to an embodiment of the present invention.

A detailed description of an embodiment of the present invention is given below with reference to the accompanying drawings. FIG. 1 is a block diagram showing the configuration of a digital camera 100 that is an embodiment of an image capture apparatus of the present invention.

In FIG. 1, an imaging system board 101 is a board having mounted thereon components (predetermined electric components) that are arranged in the image capture apparatus and mainly control an image sensor. A main board 102 is a board having mounted thereon components (predetermined electric components) that control elements other than the image sensor. An imaging system board EEPROM 103 is an electrically rewritable non-volatile storage medium that is arranged on the imaging system board 101, and has an area for storing an imaging count (number of times that imaging has been executed). An imaging control microcomputer 104 is an LSI that controls an image sensor 105 and the imaging system board EEPROM 103. The image sensor 105 is a CMOS sensor that acquires image information.

A main board EEPROM 106 is an electrically rewritable non-volatile storage medium that is arranged on the main board 102, and has an area for storing the imaging count. A camera control microcomputer 107 is a microcomputer that controls the digital camera 100, and internally includes a volatile storage area (RAM). The RAM has an area for holding the imaging count. Note that the imaging system board 101 and the main board 102 are physically separated and independently exchangeable.

Specifically, the image capture apparatus 100 includes multiple circuit boards that are independently exchangeable and have predetermined electric components in the image capture apparatus mounted thereon, and multiple non-volatile storage media that are respectively arranged on the circuit boards and store a numerical value that is accumulated during operation of the image capture apparatus (over the entire lifetime of the image capture apparatus).

The camera control microcomputer 107 receives user operation information from a user operation unit 108 and performs various types of processing by controlling other constituent elements that are connected to the camera control microcomputer 107. For example, in the case of receiving an imaging button ON notification from the user operation unit 108, the camera control microcomputer 107 performs imaging processing and increments the imaging count held in the RAM. The camera control microcomputer 107 also has a function for transitioning itself to a low power consumption mode.

The user operation unit 108 receives operations from a user, such as the pressing of various types of buttons and the switching of switches, and requests the camera control microcomputer 107 to perform control. The user operation unit 108 of the present embodiment includes at least a "power switch", a "photometry button", and an "imaging button" as operation members, and has a function for notifying the camera control microcomputer 107 of the turning or switching ON/OFF thereof. The user operation unit 108 also transmits a "photometry timer OFF" notification to the camera control microcomputer 107 when none of the operation members have been operated for a certain time.

Although omitted from the present embodiment, the user operation unit 108 may be provided with a "card lid switch" and be caused to perform power switch OFF processing when a card lid, which is the storage lid for a detachable storage medium, is opened (i.e., when an opening operation is performed). Also, the user operation unit 108 may also be caused to perform power switch OFF processing as an "auto power off" function when no operation has been performed for a long time.

An imaging drive mechanism 109 is a mechanical unit that performs driving when imaging is performed, and is configured from a mirror, a shutter, and the like. An image recording unit 110 creates an image file by adding imaging parameters and the like to image data obtained by the image sensor 105, and writes the image file to a recording medium such as a flash memory. A display unit 111 receives a request from the camera control microcomputer 107 and displays various types of information to the user. The above-described constituent elements 103 to 111 are electrically connected as shown in FIG. 1.

As previously mentioned, the imaging system board 101 and the main board 102 are physically separated and individually exchangeable. The initial value in the areas for storing the imaging count in the imaging system board EEPROM 103 and the main board EEPROM 106 is zero. Accordingly, when the imaging count is read out immediately after a board is exchanged, the value of zero is read out.

Figure 2:
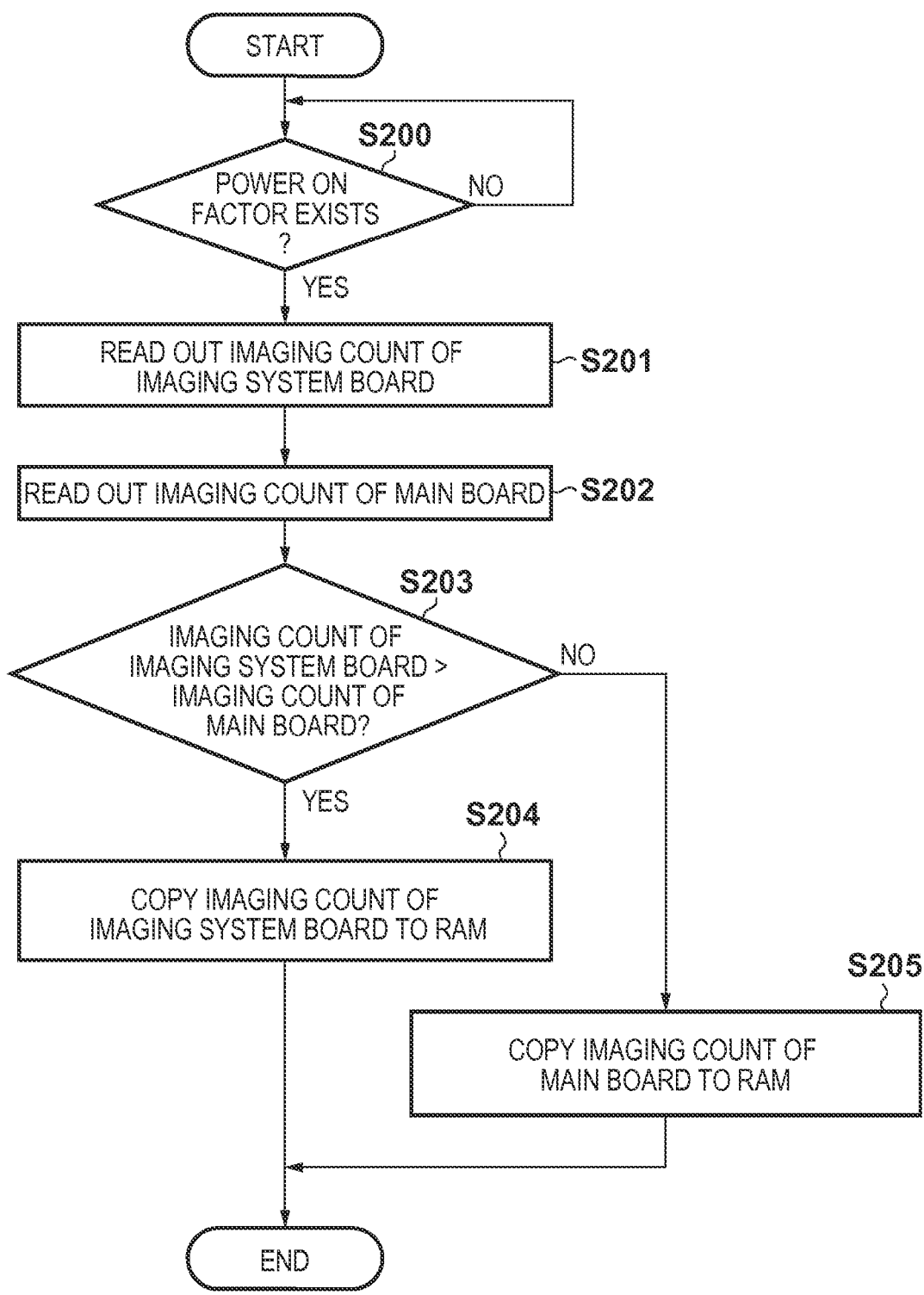
FIG. 2 is a flowchart illustrating a procedure in which an imaging count is read out from EEPROMs when the camera starts up.

Next is a description of a procedure in which the imaging count is read out from the EEPROMs when the camera starts up, with reference to the flowchart of FIG. 2.

First, in step S200, the camera control microcomputer 107 periodically acquires switch information from the user operation unit 108 and waits until the power switch is switched ON. When the power switch is switched ON, the processing of step S201 is performed.

In step S201, the camera control microcomputer 107 requests the imaging control microcomputer 104 to acquire the imaging count. The imaging control microcomputer 104 reads out the imaging count from the imaging system board EEPROM 103 and transmits the imaging count to the camera control microcomputer 107. The camera control microcomputer 107 holds the received imaging count in the RAM as the imaging count of the imaging system board 101.

In step S202, the camera control microcomputer 107 reads out the imaging count from the main board EEPROM 106, and holds the imaging count in the RAM as the imaging count of the main board 102.

In step S203, the camera control microcomputer 107 compares the imaging count of the imaging system board 101 that was acquired in step S201 and the imaging count of the main board 102 that was acquired in step S202. If the imaging count of the imaging system board 101 is greater, the processing of step S204 is performed. Otherwise, the processing of step S205 is performed.

In step S204, the camera control microcomputer 107 determines that the imaging count of the imaging system board 101 that was acquired in step S201 is the correct value and holds it in the RAM. In step S205, the camera control microcomputer 107 determines that the imaging count of the main board 102 that was acquired in step S202 is the correct value and holds it in the RAM.

By performing the processing described above, even if one of the boards is exchanged and the imaging count is cleared to zero, the imaging count can be read out from the other board.

Next is a description of a procedure in which the camera writes the imaging count to the EEPROMs with reference to the flowchart of FIG. 3.

In step S301, the camera control microcomputer 107 acquires the state of the power switch from the user operation unit 108. If the state is power OFF, the processing of step S302 is performed. If the power state is not power OFF, the processing of step S311 is performed.

In step S302, the camera control microcomputer 107 writes the imaging count that is held in its own RAM to the main board EEPROM 106 (main storage medium). In step S303, the camera control microcomputer 107 transmits the imaging count held in its own RAM to the imaging control microcomputer 104. The imaging control microcomputer 104 writes the received imaging count to the imaging system board EEPROM 103 (storage medium other than the main storage medium). In step S304, the camera control microcomputer 107 performs necessary processing and transitions itself to a lower power consumption state.

In step S311, the camera control microcomputer 107 acquires switch information from the user operation unit 108 and checks whether the photometry timer is OFF. If the photometry timer is OFF in step S311, the camera control microcomputer 107 performs the processing of step S312. If the photometry timer is not OFF, the procedure returns to the processing of step S301. In step S312, the camera control microcomputer 107 writes the imaging count held in its own RAM to the main board EEPROM 106. The imaging count is stored in the EEPROMs in accordance with the procedure described above.

Note that since writing to the imaging system board EEPROM 103 takes a longer time than writing to the main board EEPROM 106, the imaging count is not written to the imaging system board EEPROM 103 when the photometry timer turns OFF, which occurs frequently.

Although a preferable embodiment of the present invention is described above, the present invention is not limited to the above-described embodiment, and various changes and modifications can be made within the scope of the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-244985, filed Nov. 8, 2011, which is hereby incorporated by reference herein in its entirety.

What is claimed is:

1. A control apparatus for mounting in an image capture apparatus, the control apparatus comprising:
a first circuit board that is independently exchangeable and has an electric component and a non-volatile first storage unit mounted thereon;
a second circuit board that has an electric component and a non-volatile second storage unit mounted thereon; and
a controller that accumulates and stores information corresponding to an imaging count in a third storage unit at a first timing that corresponds to imaging performed by the image capture apparatus, and causes information corresponding to the information stored in the third storage unit to be stored in one of the first storage unit and the second storage unit at a second timing that occurs at a longer interval than the first timing,
wherein in a case where the information regarding the imaging count which has been stored in the first or second storage unit is moved to the third storage unit, the controller moves the information corresponding to the imaging count to the third storage unit after comparing information regarding the imaging count stored in the first storage unit and information regarding the imaging count stored in the second storage unit.

2. The control apparatus according to claim 1, wherein the controller is on the first circuit board.

3. The control apparatus according to claim 1, wherein the first timing is a timing that corresponds to a change in a power state of the image capture apparatus.

4. The control apparatus according to claim 1, wherein the third storage unit is a volatile storage unit.

5. The control apparatus according to claim 1, wherein between the information regarding the imaging count stored in the first storage unit and the information regarding the imaging count stored in the second storage unit, the controller stores the information regarding the higher imaging count in the third storage unit.

6. The control apparatus according to claim 1, wherein the first timing is a timing coordinated with shutter driving of the image capture apparatus.

7. The control apparatus according to claim 1, wherein the controller performs storage to the second storage unit less frequently than performing storage to the first storage unit.

8. The control apparatus according to claim 1, wherein the controller performs storage to the first storage unit at a timing of any of a power switch of the image capture apparatus being switched off, auto power off, an opening operation being performed on a storage lid for a storage medium that is detachable with respect to the image capture apparatus, and a photometry timer of the image capture apparatus being switched off, and performs storage to the second storage unit at a timing of any of the power switch being switched off, the auto power off, and the opening operation being performed on the storage lid.

9. An image capture apparatus comprising:
the control apparatus according to claim 1; and
a display unit capable of displaying information corresponding to an imaging count based on information stored in the third storage unit.

10. An image capture apparatus comprising:
the control apparatus according to claim 1; and
a sensor that is driven at a time of an imaging operation.

11. A method for controlling an image capture apparatus that has a first circuit board that is independently exchangeable and has an electric component and a non-volatile first storage unit mounted thereon, and a second circuit board that has an electric component and a non-volatile second storage unit mounted thereon, the method comprising:
a first storage step of accumulating and storing information corresponding to an imaging count in a third storage unit at a first timing that corresponds to imaging performed by the image capture apparatus; and
a second storage step of causing information corresponding to the information stored in the third storage unit to be stored in one of the first storage unit and the second storage unit at a second timing that occurs at a longer interval than the first timing,
wherein in a case where the information regarding the imaging count which has been stored in the first or second storage unit is moved to the third storage unit, the information corresponding to the imaging count is moved to the third storage unit after comparing information regarding the imaging count stored in the first storage unit and information regarding the imaging count stored in the second storage unit.

12. A non-transitory storage medium storing a program for causing a computer to execute the control method according to claim 11.

13. The control apparatus according to claim 1, wherein the third storage unit is mounted on the first circuit board.

* * * * *